US012683056B2

United States Patent
(12) United States Patent
Bernard et al.

(10) Patent No.: US 12,683,056 B2
(45) Date of Patent: Jul. 14, 2026

(54) ELECTROTECHNICAL DEVICE FOR AN AIRCRAFT

(71) Applicant: SAFRAN ELECTRICAL & POWER, Blagnac Cedex (FR)

(72) Inventors: Nicolas Bernard, Moissy-Cramayel (FR); Sonia Dhokkar, Moissy-Cramayel (FR)

(73) Assignee: SAFRAN ELECTRICAL & POWER, Blagnac Cedex (FR)

(*) Notice: Subject to any disclaimer, the term of this patent is extended or adjusted under 35 U.S.C. 154(b) by 906 days.

(21) Appl. No.: 17/783,985

(22) PCT Filed: Dec. 11, 2020

(86) PCT No.: PCT/FR2020/052403
§ 371 (c)(1),
(2) Date: Jun. 9, 2022

(87) PCT Pub. No.: WO2021/116632
PCT Pub. Date: Jun. 17, 2021

(65) Prior Publication Data
US 2023/0033439 A1 Feb. 2, 2023

(30) Foreign Application Priority Data
Dec. 13, 2019 (FR) ........................................ 1914414

(51) Int. Cl.
*H01F 27/02* (2006.01)
*H01F 27/245* (2006.01)
*H01F 27/26* (2006.01)

(52) U.S. Cl.
CPC ......... *H01F 27/025* (2013.01); *H01F 27/245* (2013.01); *H01F 27/266* (2013.01)

(58) Field of Classification Search
CPC ..... H01F 27/025; H01F 27/245; H01F 27/266
USPC ................................................... 381/216.004
See application file for complete search history.

(56) References Cited

U.S. PATENT DOCUMENTS 6,392,519 B1 * 5/2002 Ronning ............... H01F 27/025 336/61
2013/0222100 A1 * 8/2013 Nomura .................. H01F 41/02 336/55
2015/0365015 A1 12/2015 Ito et al.
2016/0261174 A1 9/2016 Senoo
(Continued)

FOREIGN PATENT DOCUMENTS

EP 3 467 853 A1 4/2019

OTHER PUBLICATIONS

International Search Report mailed Apr. 22, 2021, issued in corresponding International Application No. PCT/FR2020/052403, filed Dec. 11, 2020, 6 pages.
(Continued)

*Primary Examiner* — Jeremy A Luks
(74) *Attorney, Agent, or Firm* — CHRISTENSEN O'CONNOR JOHNSON KINDNESS PLLC

(57) ABSTRACT

An electrotechnical device for an aircraft includes a housing having a surface and a magnetic circuit formed by a stack of laminated sheets and composed of a yoke. The yoke is fixed on the surface of the housing by means of a thermal interface and has a surface. At least one low-frequency coil component is attached to at least part of the surface of the yoke by attachment means.

11 Claims, 9 Drawing Sheets

(56) References Cited

U.S. PATENT DOCUMENTS

| | | | | |
|---|---|---|---|---|
| 2018/0261371 | A1 | 9/2018 | Tsukada et al. | |
| 2018/0286554 | A1* | 10/2018 | Kojima | H01F 17/045 |
| 2019/0148049 | A1* | 5/2019 | Takiguchi | H01F 27/025<br>336/61 |
| 2019/0392975 | A1* | 12/2019 | Delette | H01F 27/266 |
| 2022/0340801 | A1* | 10/2022 | Navarro Perez | C08K 3/36 |
| 2023/0008213 | A1* | 1/2023 | Dhokkar | H01F 27/306 |

OTHER PUBLICATIONS

Written Opinion mailed Apr. 22, 2021, issued in corresponding International Application No. PCT/FR2020/052403, filed Dec. 11, 2020, 6 pages.

English translation of Written Opinion mailed Apr. 22, 2021, issued in corresponding International Application No. PCT/FR2020/052403, filed Dec. 11, 2020, 5 pages.

International Preliminary Report on Patentability mailed May 17, 2022, issued in corresponding International Application No. PCT/FR2020/052403, filed Dec. 11, 2020, 7 pages.

* cited by examiner

ELECTROTECHNICAL DEVICE FOR AN AIRCRAFT

FIELD OF THE DISCLOSURE

The disclosure relates to an electrotechnical device for an aircraft comprising low-frequency coil components, such as inductors or power transformers, which are integrated in a yoke attached to a housing via a thermal interface.

BACKGROUND

The prior art comprises in particular the documents US-A1-2015/365015, US-A1-2018/261371, US-A1-2016/261174 and EP-A1-3 467 853.

It is well known that electrotechnical equipment is used in the field of aeronautics.

One of the current problems with this equipment is its integration and the optimization of its mass and its volume.

These electrotechnical equipment can comprise coil components, such as inductors or power transformers, which are integrated within a system such as, for example, with power electronics and control boards, an actuator etc. It is then necessary to adapt the shape and minimize the volume of these coil components for their integration in the system. In addition, the integration of these coil components must be reliable and must allow to reach the desired performances, but also must respect the severe environmental constraints, such as thermal constraints, electromagnetic compatibility (EMC), or vibrations.

The conventional solutions for the realization of inductor type components are generally based on magnetic circuits made of ferrite or composite materials. These components are made in the form of bars assembled with one or more coil supports, or in the form of one or more cores which are then coiled directly on the magnetic circuit or circuits.

However, these components are not compact, and therefore have a large mass and volume, and as a result, their integration into a system is complex.

In addition, this type of material generally has a low mechanical strength and a low conductivity. It is therefore necessary to reduce the losses by Joule effect, or to set up a dedicated system to ensure the thermal dissipation and the maintenance of the coil components effective with regard to the constraints of vibrations encountered.

In addition, the manufacturing method for these components is usually complex. Thus, the tolerances of the magnetic properties of these components are generally variable, in the range of 20% to 30%, which directly affects the uncertainty of the parameters of the components obtained during production validation tests and the margins to be taken into consideration when designing the electrotechnical equipment.

The conventional solutions for the realization of power transformer components are generally based on magnetic circuits made either by sheet metal blocks formed of several portions which are assembled by gluing, or by alternate stacking of plates, or by winding thin sheet-metal tape.

However, there are usually residual air-gaps, intrinsic to the manufacturing mode (in particular during the gluing of several portions forming the sheet metal blocks), which are difficult to control during manufacturing, and which directly influence the characteristics of the component.

Generally speaking, these components are generally parallelepipedal in shape and do not fit easily into a circular housing or casing. Indeed, these components require specific parts, such as strapping of cut circuits, to ensure their maintenance and/or to make their attachment in their environment.

The purpose of the disclosure is to propose a solution allowing to remedy at least some of these disadvantages.

In particular, the disclosure proposes to reduce the mass and the volume, and thus the overall dimension, of these components, in order to facilitate their integration.

SUMMARY

To this end, the subject matter of the disclosure is an electrotechnical device for an aircraft comprising:

- a housing having a surface,
- a magnetic circuit formed by a stack of laminated sheets and composed of a yoke, the yoke being attached on the surface of the housing by a thermal interface, the yoke having a surface,
- at least one low-frequency coil component, the coil component being attached to at least one portion of the surface of the yoke by attachment means.

According to the disclosure, the terms "low-frequency" correspond to a frequency lower than or equal to 500 kHz depending on the materials used.

The device according to the disclosure allows a simple mechanical integration of the coil components, which allows to limit the attaching and maintaining parts of the components and of the device. In addition, the device according to the disclosure allows to mutualize a plurality of coil components on a same structure, here the yoke.

The modularity of the device according to the disclosure allows the device to adapt to the integration and environmental constraints (EMC, thermal or vibratory constraints).

Moreover, the manufacturing method of the magnetic circuit of the device according to the disclosure is simple, the steps of cutting (laser, water, wire, etc.) and assembling the laminated sheets being controlled. This allows to ensure that a variation of the electrical parameters of the components vary within a small range of about 5%.

The coil components are confined to the yoke, and therefore to the housing, with its environment (e.g. a power and control electronics portion, actuator, a generator etc.) arranged in a compact manner, so as to minimize the volume of the device and the length of the electrical connections between the coil components connected in series or in parallel, or with any other type of wiring in the case of power transformers (e.g. star, delta, zigzag etc.).

The yoke serves as a structure for the coil components, and allows them to be attached to the housing.

The yoke advantageously has a thermal dissipation function by conduction. The contact between the yoke and the housing allows to facilitate the thermal dissipation of the iron and Joule effect losses of the device.

According to the disclosure, the magnetic circuit and the yoke are formed in one part. This allows to reduce the manufacturing costs, the mass of the device and ensures an optimum thermal dissipation of the losses outward.

According to one embodiment, the thermal interface between the magnetic circuit and the housing is a thermal paste, and the yoke is attached to the housing.

According to another embodiment, the thermal interface comprises a phase change material.

In another embodiment, the component can be glued directly to the housing. The glue performs the function of mechanical holding and thermal conduction towards the housing. In this case, it is possible not to use attachment flanges, if the considered environment allows it.

Advantageously, the attachment means are configured to ensure that the coil components are held on the yoke along each axis.

With the yoke being attached to the housing by a thermal interface, the attachment means are adjusted to exert sufficient pressure to ensure a predetermined thermal resistance.

According to one embodiment, the surface of the housing and/or the surface of the yoke is flat.

According to another embodiment, the surface of the housing and/or the surface of the yoke is concave.

According to another embodiment, the surface of the housing and/or the surface of the yoke is convex.

The magnetic circuit can be formed by a stack of laminated iron-silicon, iron-nickel, or iron-cobalt sheets.

The or each coil component can be a power transformer and/or an inductor. The device may comprise a plurality of coil components, the coil components being power transformers only, or inductors only, or both power transformers and inductors.

According to one embodiment, a coil component can be made of enamelled round wire of copper, aluminium or composite alloy, optionally twisted.

According to another embodiment, a coil component can be made by a copper/aluminium flat, or by an insulated copper or aluminium foil.

In order to guarantee a thermal homogenization, the coiling and/or the magnetic circuit of the coil component can be impregnated and/or encapsulated.

The yoke may comprise at least one protrusion extending radially, in particular perpendicularly, from the surface of the yoke, the protrusion comprises at least one first tooth, at least one coil being integrated on the protrusion around the first tooth. According to the disclosure, a coil component is formed by one or a plurality of coils integrated with their magnetic circuit.

The protrusion may comprise a plurality of first teeth, with at least one coil being integrated around each first tooth.

The protrusion may comprise two second teeth surrounding the first tooth, with at least one coil integrated on the protrusion between the second teeth.

The protrusion may comprise a plurality of second teeth, with two second teeth surrounding a first tooth, with at least one coil integrated between second teeth, around each first tooth.

The magnetic circuit can comprise at least one air-gap. An air-gap advantageously allows the magnetic flux in the coil components to be controlled. Indeed, an air-gap allows to avoid the dependence on the variations of the electrical properties of the material constituting the magnetic circuit. Moreover, depending on its positioning, the air-gap or the air-gaps can allow to simplify the coiling portion, for example, in the case of a reduction objective of the manufacturing costs.

The magnetic circuit may comprise at least one radial air-gap, i.e., extending in a radial direction across the surface of the yoke.

Alternatively, the magnetic circuit may comprise at least one longitudinal air-gap, i.e. extending along the longitudinal axis of the surface of the yoke.

The coil components may be aligned on at least one portion of the surface of the yoke so as to form a line of coil components, and each end of the line of coil components may be attached to the surface of the yoke by the attachment means. In other words, the attachment means can be arranged only at the ends of the line of coil components.

Each coil component can be attached to at least one portion of the surface of the yoke by the attachment means, and the attachment means can be arranged between each coil component. In this case, the yoke may not comprise protrusion.

The coil components can be single-phase components that allow to provide power electronic functions such as filtering, smoothing, parallelization or energy transfer.

According to one embodiment, the device comprises two low-frequency coil components, the coil components being coils connected in series, and each coil being wound around a first tooth.

The coils can have an identical direction of flux. Alternatively, the coils can be in opposite flux.

The protrusion can be provided with an air-gap, in order to minimize the volume to mass ratio of the magnetic circuit and reduce the sensitivity to the variations in the magnetic properties of the material of the magnetic circuit.

When the coil components comprise inductors, these inductors can be coupled or uncoupled, and/or interleaved. The inductors can be connected in series or in parallel.

According to another embodiment, the device comprises a plurality of low-frequency coil components, the coil components being multi-phase coupled coils, each coil being wound around a first tooth, and the coils being integrated over the entire surface of the yoke.

According to another embodiment, the coil component is a multi-phase power transformer or autotransformer formed by a plurality of single-phase coils, each coil being wound around a first tooth. Depending on the manufacturing method adopted, a distributed type of coiling can also be implemented.

The protrusion can be provided with a radial air-gap, in order to increase the magnetic leaks and the self-inductances.

The protrusion can be provided with longitudinal air-gaps, in order to limit the magnetic flux and to increase the magnetizing inductances.

The number of coils per phase depends on the integration constraints, and can be varied to reduce the thickness of the device.

The or each coil component can be insulated from the yoke and its magnetic circuit by an electrically insulating material, for example a Kapton® type material or epoxy resin.

The housing and/or the yoke can be equipped with cooling means.

The cooling means may comprise at least one of the following means:

- fins extending radially or axially from an external surface of the housing and/or of the yoke.
- fluid circulation channels, in which a pressurized fluid circulates, and/or
- means for spraying a fluid, and/or heat pipes (i.e. heat conducting elements).

The radial or axial fins allow to increase the exchange coefficients, in the case of forced air or fluid cooling, or in the case of natural convection and bubbling in a fluid such as oil. The fins can be treated by a specific treatment to increase the radiation, and thus the exchange coefficient (radiation).

The pressurized fluid circulating in the fluid circulation channels can be oil or glycol water.

The means for spraying a fluid can be configured to spray oil or water under pressure.

The cooling means may also comprise orifices in the yoke and ventilation means arranged so as to make circulate air through the orifices in the yoke. A similar system based on oil cooling can also be implemented using channels made in the housing and/or in the yoke.

Thus, the device can be cooled by natural convection (for low density), or by forced convection with air circulating inside and/or outside the device, or by forced convection with a fluid circulating in the housing and/or in the yoke.

The disclosure also relates to an aircraft comprising at least one electrotechnical device according to the disclosure.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different embodiments have the same references in the figures.

DETAILED DESCRIPTION

Figure 1:
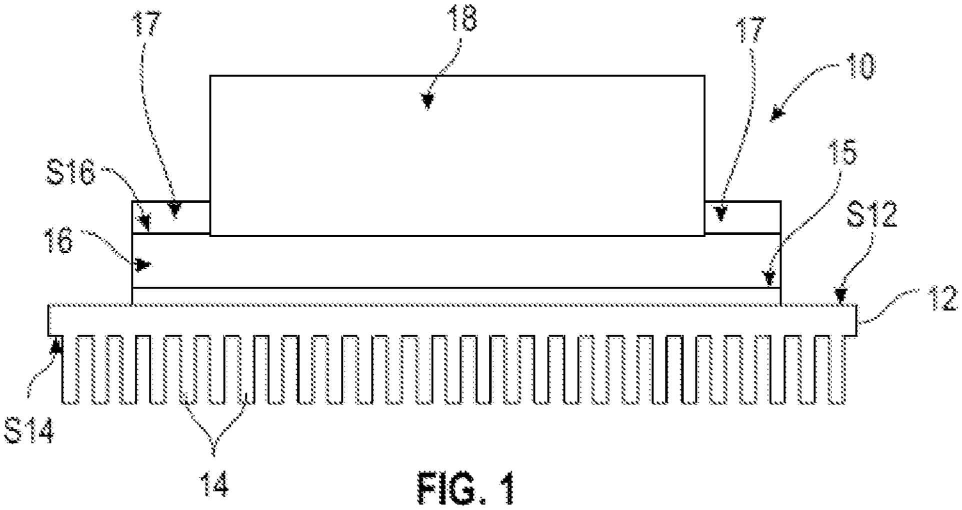
FIG. 1 is a very schematic view of the device according to the disclosure, comprising a coil component, for example of the power transformer type.
Figure 2:
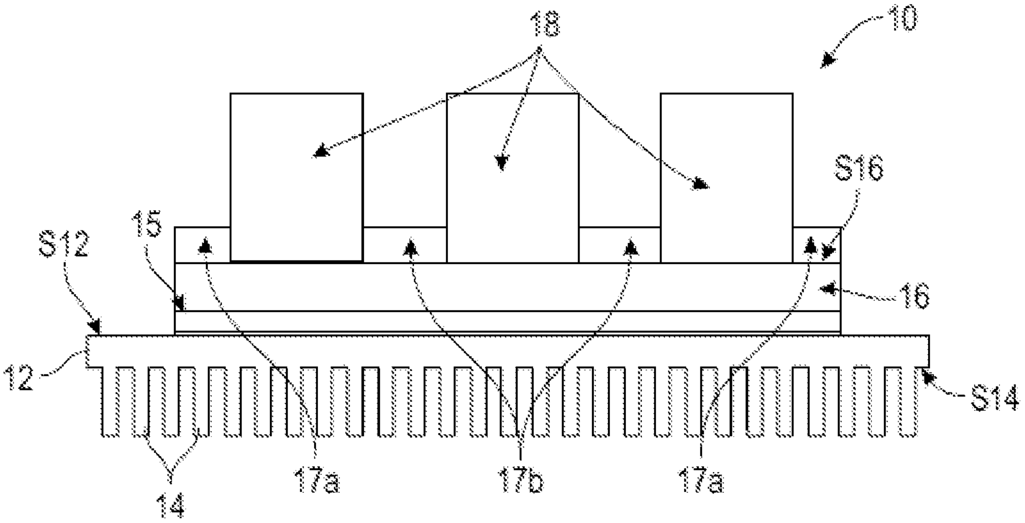
FIG. 2 is a very schematic view of the device according to the disclosure, comprising coil components, for example of the coil type.
Figure 3:
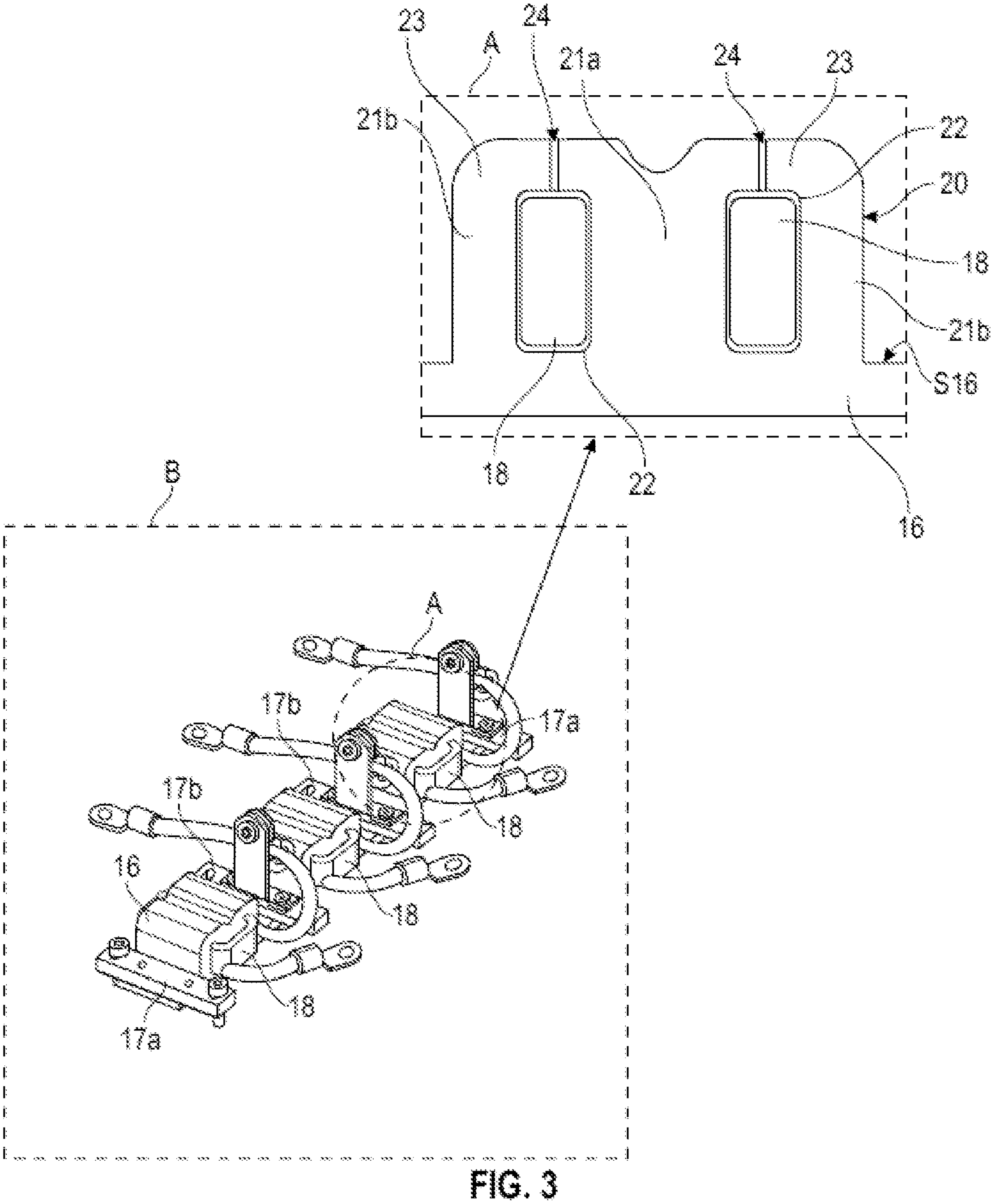
FIG. 3 is a schematic perspective view of the yoke and the coil-type coil components of the device according to one embodiment of the disclosure, and in the box A, an enlarged cross-sectional view of a portion of the device.

FIGS. 1 to 3 show electrotechnical devices for aircraft according to the disclosure.

A device 10 comprises a housing 12 having a surface S12 and comprising cooling means. In FIGS. 1 and 2, the cooling means are in the form of fins 14 that extend radially from an external surface S14 of the housing 12. The housing 12 can be a casing. The surface S12 of the housing 12 can be flat, as shown in FIGS. 1 and 2, or concave, or convex.

The device also comprises a magnetic circuit formed by a stack of laminated sheets. The laminated sheets forming the magnetic circuit can be insulated magnetic sheets, by a varnish or by a specific treatment according to the material used, so as to make the laminated magnetic circuit of only one part. The magnetic circuit is therefore cut out of laminated sheets in one portion. There is no assembly of several portions to form the magnetic circuit. This allows to avoid assembly problems and guarantee the electrical parameters of the component. The magnetic circuit can be formed by a stack of laminated iron-silicon, iron-nickel, or iron-cobalt sheets. The thickness of the laminated sheets is chosen according to the envisaged eddy current losses contributing to the efficiency of the component. Note that the modification of the thickness of the magnetic circuit is a factor that allows to adapt the characteristics of the component (inductances, voltages etc.) without changing its definition (sheet metal, conductor section etc.).

The magnetic circuit consists of a yoke 16 which has a surface S16. The magnetic circuit and the yoke are therefore formed in one part. The yoke 16 is attached to the surface S12 of the housing 12. The surface S16 of the yoke 16 can be flat, as shown in FIGS. 1 to 3, or concave, as shown in FIGS. 5A to 10, or convex.

A thermal interface 15 is positioned between the yoke 16 and the housing 12, and then the component is attached via flanges positioned on the yoke 16. The thermal interface 15 can be a thermal paste. Thus, the yoke 16 can be glued to the housing 12, and more precisely to the surface S12 of the housing 12. Alternatively, the thermal interface 15 may comprise a phase change material. This advantageously allows a good thermal contact between the yoke and the housing, and thus a good thermal exchange between the yoke and the housing, and thus a better cooling of the device. This also allows to eliminate the need for additional parts to attach the yoke to the housing.

The yoke 16 has a mechanical strength function and a thermal dissipation function by conduction towards the housing 12. The contact between the yoke 16 and the housing 12 allows to facilitate the thermal dissipation of the Joule effect losses of the device 10.

Although not shown, the cooling means may comprise orifices made in the yoke 16 and fluid or ventilation means arranged so as to make circulate a fluid or an air flux through these orifices.

Thus, the device can be cooled by natural convection, or by forced convection with air circulating inside and/or outside the device 10, or by forced convection with a fluid circulating in the housing 12 or in the yoke 16.

The device 10 also comprises one or more low-frequency coil components 18. The coil components 18 may be of the power transformer type, as shown in FIG. 1, and/or the coil type, as shown in FIGS. 2 and 3. The device 10 may comprise only power transformers, or only coils, or both power transformers and coils. In FIG. 1, the coil component 18 is attached to the entire surface S16 of the yoke 16, while in FIG. 2, the three coil components 18 are attached to only a portion of the surface S16 of the yoke 16. Of course, the device 10 may comprise a different number of coil components 18, which may be arranged differently on the surface S16 of the yoke 16.

The coil components are attached to at least one portion of the surface S16 of the yoke 16 by attachment means 17. The attachment means 17 are configured to ensure that the coil components 18 are held on the yoke 16 along each axis, i.e., in the direction of the axes defining the surface S16 of the yoke 16 and in the direction radial to the surface S16 of the yoke 16.

As shown in FIG. 2, the coil components 18 may be aligned on the surface S16 of the yoke 16 so as to form a line of coil components 18. Each end of the line of coil components 18 can be attached to the surface S16 of the yoke 16 by attachment means 17*a*.

As shown in FIG. 2, each coil component 18 may also be attached to the surface S16 of the yoke 16 by attachment means 17*b* arranged between each coil component 18.

In FIG. 3, the attachment flanges 17*a*, 17*b* are in the form of retaining plates screwed to the housing 12.

Since the yoke 16 is connected to the housing 12 by a thermal interface 15, the attachment means 17 are specified to exert sufficient pressure to ensure the desired thermal resistance.

In particular, the yoke 16 serves as a structure for the coil components, and allows the holding and the support of their attachment to the housing 12. The yoke advantageously allows the type and the number of coil components to be adapted according to the needs of the device and the integration of the device with its environment.

The coiling of a coil component 18 may be made of enamelled round wire of copper, aluminium or composite alloy, possibly twisted, or of a flat of copper or aluminium, or of an insulated copper or aluminium foil. The coiling can be made by a copper foil, following a copper annealing process, so as to allow a good cohesion of the coil component. The coiling and/or the magnetic circuit can be impregnated and/or encapsulated.

The magnetic circuit allows to channel the magnetic flux of the coil components 18.

The yoke 16 may comprise protrusions 20 extending radially from the surface S16. A protrusion 20 may comprise at least one central tooth 21*a* surrounded by two outer teeth 21*b*. Alternatively, a protrusion 20 may comprise only one or a plurality of central teeth 21*a*, or only two outer teeth 21*b*. As shown in the box A of FIG. 3, a coil 18 is integrated on a protrusion 20. One or more coils integrated in their magnetic circuit form a coil component. This coil 18 is wound around the central tooth 21*a*, and is surrounded by the two outer teeth 21*b*. The central tooth 21*a* may be connected at its radial end to the outer teeth 21*b* by a connecting segment 23 that extends longitudinally to the surface S16 of the yoke 16.

As shown in the box A of FIG. 3, a coil 18 may be insulated from the yoke 16, and thus from its magnetic circuit, by an electrically insulating material 22, such as a Kapton® type material or epoxy resin.

As shown in the box A of FIG. 3, the protrusion 20 may be provided with radial air-gaps 24. These air-gaps 24 extend in the radial direction to the surface S16 of the yoke 16. These radial air-gaps 24 are arranged on the connecting segment 23 connecting the central tooth 21*a* and the outer teeth 21*b*.

Figure 4:
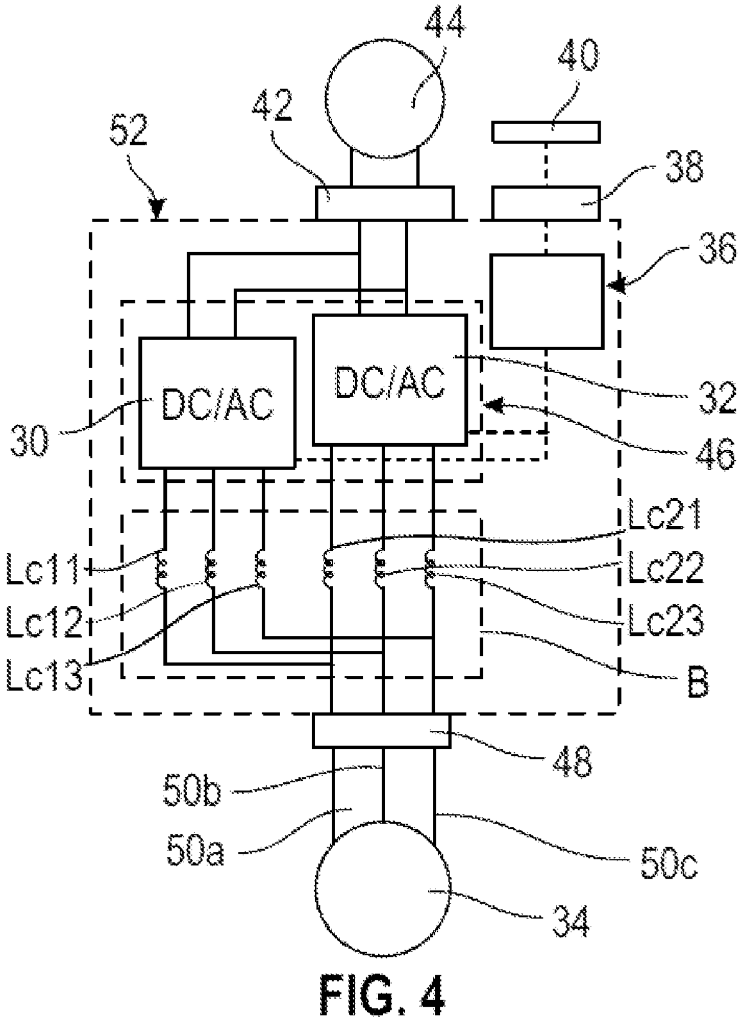
FIG. 4 is a schematic view of a configuration comprising the device according to the disclosure.

FIG. 4 shows an example of configuration that comprises a device according to the disclosure. The device comprises six uncoupled coils Lc11, Lc12, Lc13, Lc21, Lc22, and Lc23 that are configured to parallel two inverters 30, 32 to control an electric actuator 34. The coils Lc11-Lc23 are connected to the actuator 34 via a connector 48 and power cables 50*a*, 50*b*, 50*c*. The coils Lc11-Lc23 are interphase coils. These coils are configured to limit the fault current between each same phase of the inverters 30, 32 and to limit over-voltages to the terminals of the electric actuator 34. The coils Lc11-Lc23 in the box B of FIG. 4 correspond to the coils 18 in FIG. 3. The inverters 30, 32 can be DC-AC power converters (DC-AC for Direct Current-Alternative Current). The inverters 30, 32 form a power electronics portion 46, which is connected to a control electronic board 36, which forms a control electronic portion. The control electronic board 36 is connected, via a connector 38, to a communication bus 40. The inverters 30, 32 are connected, via a connector 42, to a direct current bus 44. The set of coils Lc11-Lc23, the power electronics 46 and the control electronics 36 form the equipment 52 which is arranged in the yoke 16, and thus in the housing 12, and which can, for example, be easily integrated into a switch cabinet.

Figure 5B:
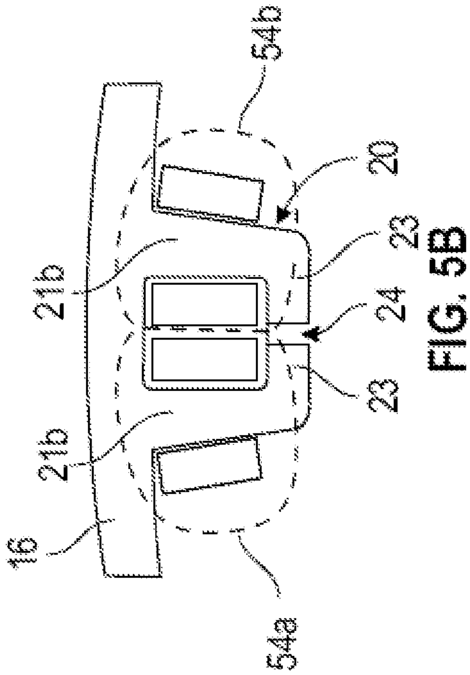
FIGS. 5A and 5B are cross-sectional views of coil components integrated into a yoke according to one embodiment of the disclosure, without and with an external radial air-gap, respectively.
Figure 5A:
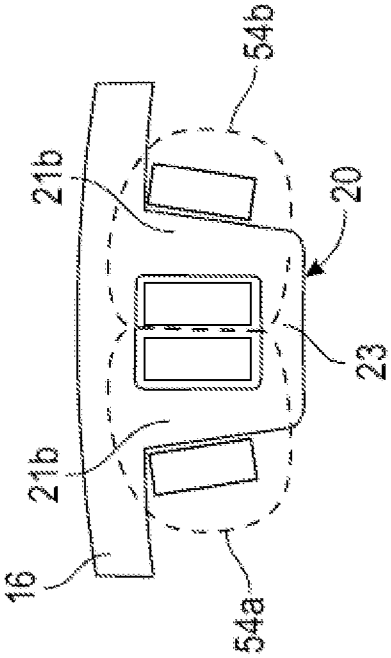

As shown in FIGS. 5A and 5B, the device may comprise two coils 54*a*, 54*b* connected in series and having an identical direction of flux. These coils are single-phase components which allow to ensure filtering, smoothing, parallelization or energy transfer functions. The coils 54*a*, 54*b* are integrated on a protrusion 20 of the yoke 16. In these figures, the protrusion 20 comprises only two outer teeth 21*b*, which are connected to each other by a connecting segment 23 at their radial end. Each coil 54*a*, 54*b* is wound around an outer tooth 21*b*. These coils 54*a*, 54*b* are not completely surrounded by the protrusion 20. These coils can be made on one or more protrusions 20 of the yoke 16 in order to minimize their height.

In order to minimize the volume-to-mass ratio of the magnetic circuit and to reduce the dependence on variations in the magnetic properties of the material used to make the magnetic circuit, a radial air-gap 24 can be added, as shown in FIG. 5B. Thus, the protrusion 20 is provided with an air-gap 24 that extends in a direction radial to the surface S16 of the yoke 16. The radial air-gap 24 is arranged on the connecting segment 23 of the outer teeth 21*b* of the protrusion 20.

As shown in FIGS. 6A to 6D, the device may comprise an uncoupled coil 56. This coil 56 is integrated into a protrusion 20 of the yoke, and more precisely wound around the central tooth 21*a* of the protrusion 20. This coil 56 is surrounded by the two outer teeth 21*b* of the protrusion 20. These outer teeth form return branches on the coil 56. This allows to reduce the EMC problems, and in particular the radiated emissions induced by the leakage fluxes of the coils, which can disturb the electronic boards, sensors and other coil components located in the vicinity. These outer teeth allow to channel a portion of this magnetic flux.

Figure 6A:
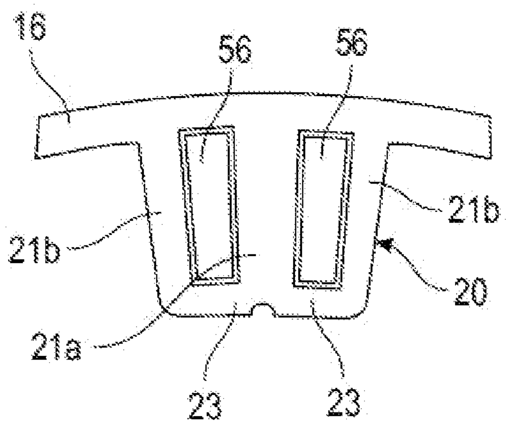
FIGS. 6A to 6D are cross-sectional views of coil components integrated into a yoke according to an embodiment of the disclosure, respectively without air-gaps, with an internal longitudinal air-gap, with external longitudinal air-gaps and with external radial air-gaps.
Figure 6B:
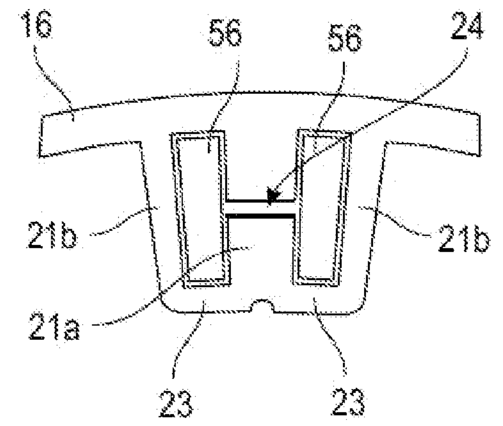
Figure 6C:
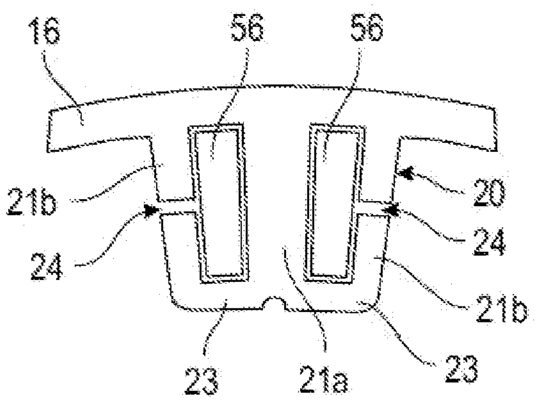
Figure 6D:
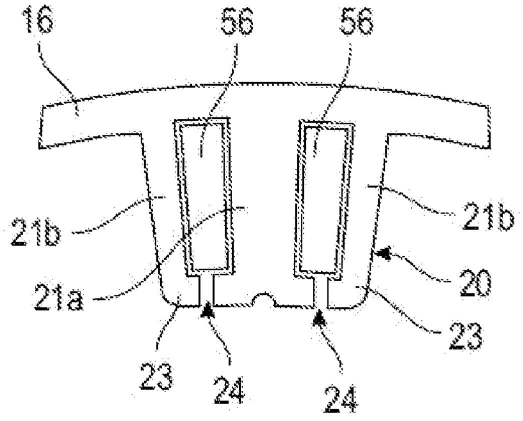

The magnetic circuit in FIG. 6A comprise no air-gap, while the magnetic circuits in FIGS. 6B to 6D comprise one or more air-gaps 24.

As shown in FIG. 6B, the longitudinal air-gap 24 may be positioned on the central tooth 21*a*. This allows to reduce the disturbances between the coil components.

As shown in FIG. 6C, the longitudinal air-gaps 24 can be positioned on the outer teeth 21*b*. As shown in FIG. 6D, the radial air-gaps 24 may be positioned on the outer teeth 21*b*, and more specifically on the connecting segment 23 between the outer teeth 21*b*. The position of the air-gaps on the outer teeth advantageously allows to facilitate the coiling operation.

As shown in FIGS. 7A to 7E, the device may comprise two coils 58*a*, 58*b* wound so as to be in opposite flux. The coils 58*a*, 58*b* are interleaved or coupled. In particular, the components are coupled or common mode interphase inductors that can manage the differential mode in the case of the topologies shown in FIGS. 7C-7E. The coils 58*a*, 58*b* are integrated in a protrusion 20 of the yoke 16.

Figure 7A:
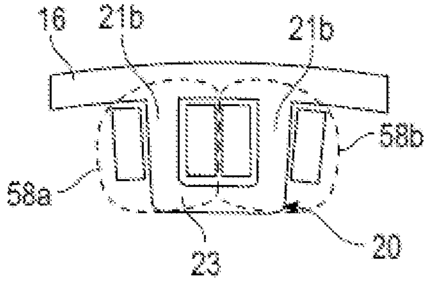
FIGS. 7A to 7E are cross-sectional views of coil components integrated into a yoke according to an embodiment of the disclosure, respectively without air-gap, with a radial external air-gap, with a longitudinal internal air-gap, with radial external air-gaps and with longitudinal external air-gaps.
Figure 7B:
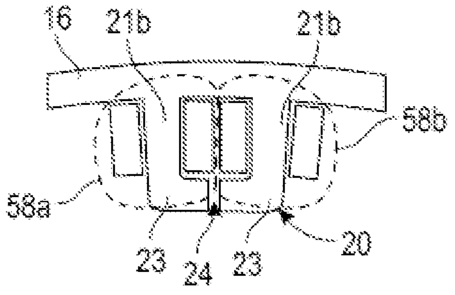

In FIGS. 7A and 7B, the protrusion 20 comprises only two outer teeth 21*b*, which are connected to each other by a connecting segment 23 at their radial ends. Each coil 58*a*, 58*b* is wound around an outer tooth 21*b*. These coils 58*a*, 58*b* are not completely surrounded by the protrusion 20. As shown in FIG. 7B, a radial air-gap 24 may be positioned on the connecting segment 23 between the outer teeth 21*b*.

However, with this topology arrangement, the resulting magnetic flux closes in the air, which can cause induced currents in the surrounding metal elements and disturb electronic boards or coil components nearby.

Figure 7C:
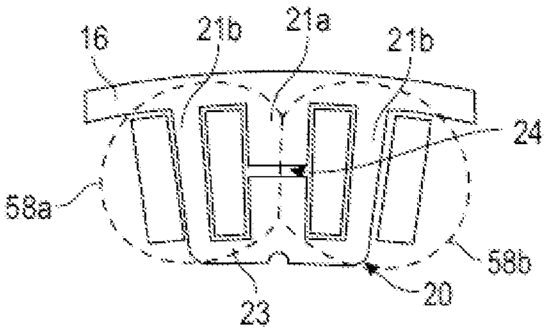

In FIG. 7C, the protrusion 20 comprises two outer teeth 21*b*, which are connected to each other by a connecting segment 23 at their radial ends. As before, each coil 58*a*, 58*b* is wound around an outer tooth 21*b*. These coils 58*a*, 58*b* are therefore not completely surrounded by the protrusion 20. An additional tooth, here a central tooth 21*a*, is added compared to FIGS. 7A and 7B in order to channel this resulting flux and control the leakage inductance of the component. The coils 58*a*, 58*b* are separated by the central tooth 21*a*. The coils 58*a*, 58*b* are separated by the central tooth 21*a*.

Figure 7D:
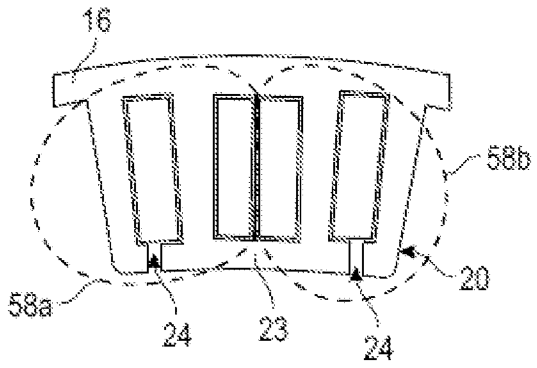
Figure 7E:
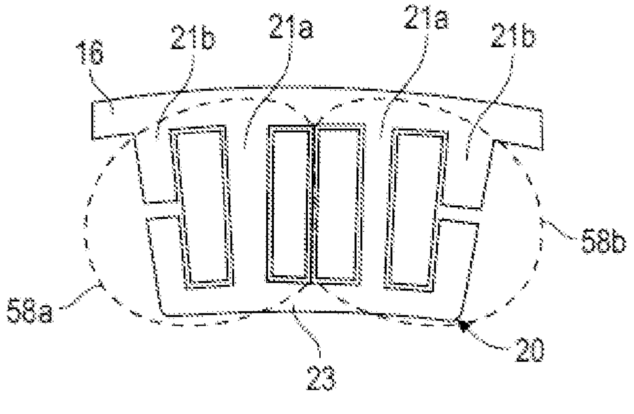

In FIGS. 7D and 7E, the protrusion 20 comprises two central teeth 21*a*, which are connected to each other by a connecting segment 23 at their radial ends. Each coil 58*a*, 58*b* is wound around a central tooth 21*a*. Additional teeth, in this case two outer teeth 21*b*, are added with respect to FIGS. 7A and 7B so as to channel this resulting flux and control the leakage inductance of the component. Each coil 58*a*, 58*b* is surrounded by an outer tooth 21*b* and the other coil 58*b*, 58*a*. Thus, these coils 58*a*, 58*b* are completely surrounded.

As shown in FIG. 7C, a longitudinal air-gap 24 may be positioned on the central tooth 21*a*. This allows the magnetic flux to be channeled into the central tooth 21*a*, which has a high equivalent reluctance compared to the main reluctance, so that the mutual inductance is as high as possible (differential mode management).

As shown in FIG. 7D, the radial air-gaps 24 may be positioned on the outer teeth 21*b*, and more specifically on the connecting segment 23 between the outer teeth 21*b*. As shown in FIG. 7E, the longitudinal air-gaps 24 can be positioned on the outer teeth 21*b*. This advantageously allows to have an armoured version, by channeling the resulting magnetic flux in the outer teeth 21*b*.

Figure 8A:
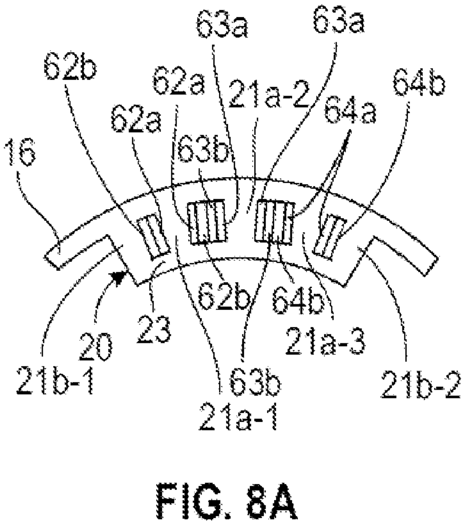
FIGS. 8A to 8C are cross-sectional views of coil components integrated into a yoke according to an embodiment of the disclosure, respectively without air-gaps, with external radial air-gaps and with external longitudinal air-gaps.
Figure 8B:
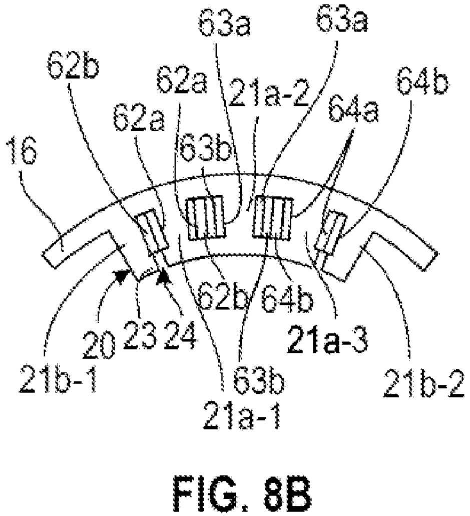
Figure 8C:
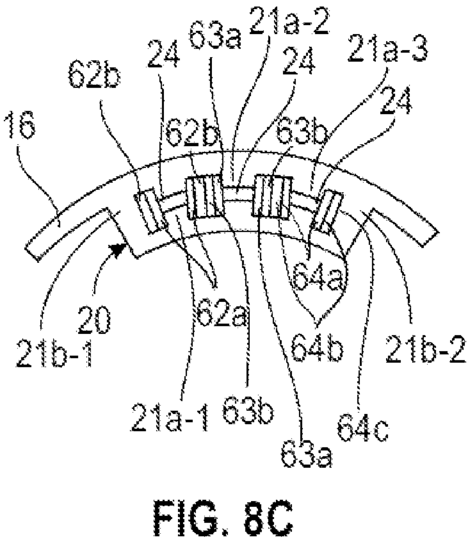

A multi-phase free-flux power transformer, or autotransformer, can be formed by a plurality of coils. The coils can be connected according to the adopted configuration (star, triangle, zigzag, etc.) and arranged in series or in parallel according to the needs related in particular to the integration portion. The number of coils depends on the desired function. FIGS. 8A to 8C show an example of an embodiment of a device comprising a multi-phase power transformer formed by three-phase coils 62*a*, 62*b*, 63*a*, 63*b*, 64*a*, 64*b* of the armoured type, the coils being locally integrated on only a portion of the surface S16 of the yoke 16. The coils 62*a*, 63*a*, 64*a* are primary coils and the coils 62*b*, 63*b*, 64*b* are secondary coils. In this example, the transformer is galvanically isolated. In other words, there is no electrical connection between the primary portion and the secondary portion.

In FIGS. 8A to 8C, the protrusion 20 comprises three central teeth 21*a*-1, 21*a*-2, 21*a*-3 and two outer teeth 21*b*, which are connected to each other by a connecting segment 23 at their radial ends. The coils 62*a*-62*b* are wound around a first tooth 21*a*-1, while the coils 63*a*-63*b* are wound around a second tooth 21*a*-2 and the coils 64*a*-64*b* around a third tooth 21*a*-3. Specifically, the coils 62*a*-62*b* are concentric, with the coil 62*b* being wound around the coil 62*a*, which is itself wound around the first tooth 21*a*-1.

Similarly, the coils 63*a*-63*b* are concentric, with the coil 63*b* being wound around the coil 63*a*, which is itself wound around the second first tooth 21*a*-2. Similarly, the coils 64*a*-64*b* are concentric, with the coil 64*b* being wound around the coil 64*a*, which is itself wound around the third tooth 21*a*-3. The coil 62*b* is surrounded by an outer tooth 21*b*-1 and by the second central tooth 21*a*-2. The coil 64*b* is surrounded by an outer tooth 21*b*-2 and the second central tooth 21*a*-2. Thus, the coils 62*a*-64*b* are completely surrounded. In these figures, there are thus two coils integrated around each tooth 21*a*-1, 21*a*-2 and 21*a*-3, one for the primary portion, and one for the secondary portion.

The magnetic circuit in FIG. 8A comprise no air-gap, while the magnetic circuits in FIGS. 8B and 8C comprise air-gaps 24.

As shown in FIG. 8B, the radial air-gaps 24 may be positioned on the outer teeth 21*b*, and more specifically on the connecting segment 23 between the outer teeth 21*b*. This advantageously allows to increase the magnetic leaks and the self-inductance.

As shown in FIG. 8C, the longitudinal air-gaps 24 may be positioned on the central teeth 21*a*-1, 21*a*-2, 21*a*-3. This advantageously allows to limit the magnetic flux. When the air-gaps are positioned on the outer teeth, this allows to increase the magnetizing inductances.

The air-gaps allow to adjust the parameters of the power transformer and to reduce the impact of the material composing the magnetic circuit.

Depending on the integration constraints, the number of teeth or coils per phase can be increased. Also, the pattern developed on the whole yoke can be modified, connecting each coil of the same phase in series or in parallel to reduce the thickness of the device.

Figure 9A:
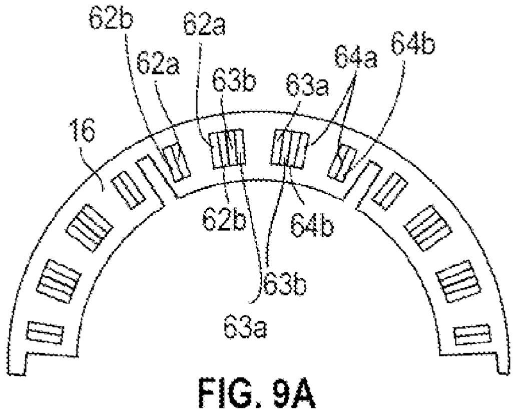
FIGS. 9A to 9C are cross-sectional views of coil components integrated in a yoke according to an embodiment of the disclosure, respectively without air-gap, with external radial air-gaps and with external longitudinal air-gaps.
Figure 9B:
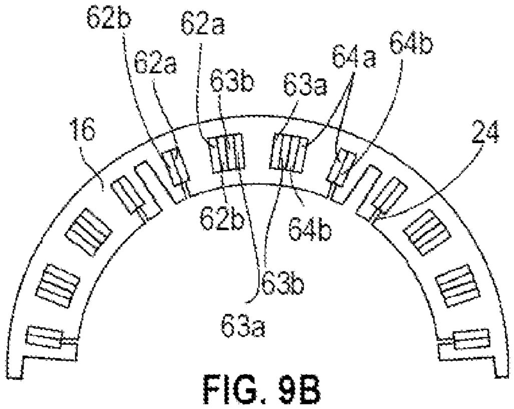
Figure 9C:
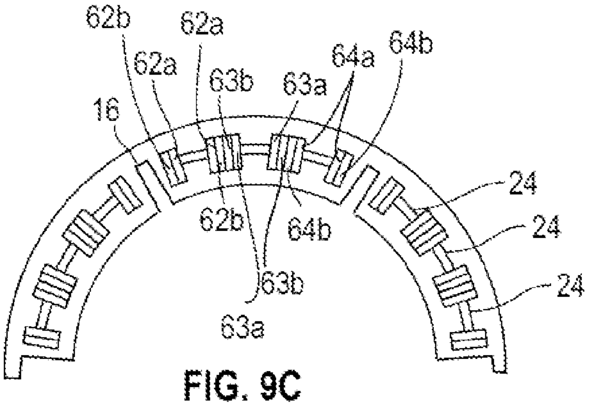

For example, FIGS. 9A to 9C show FIGS. 8A to 8C, respectively, with a replicate of the transformer on the surface S16 of the yoke 16. The primary coils 62*a*, 63*a*, 64*a* and the secondary coils 62*b*, 63*b*, 64*b* are integrated over the entire circumference of the surface S16 of the yoke 16. This configuration advantageously allows to maximize the central space of the yoke 16.

Figure 10:
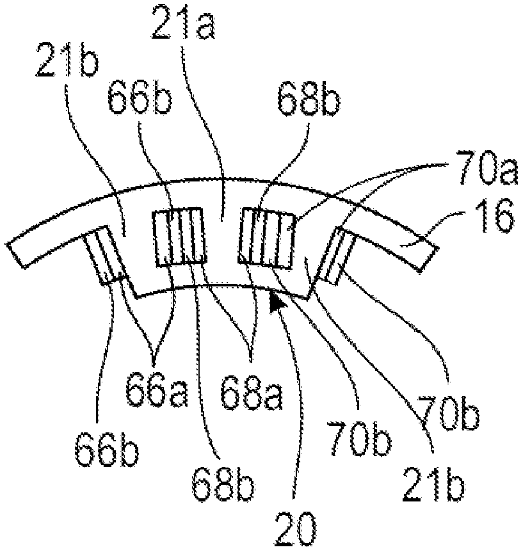
FIG. 10 is a cross-sectional view of coil components integrated into a yoke according to an embodiment of the disclosure.

A transformer, or a forced-flux multi-phase autotransformer, can be implemented locally on only a portion of the surface S16 of the yoke 16, as shown in FIG. 10. The transformer comprises six coil components 66*a*, 66*b*, 68*a*, 68*b*, 70*a* and 70*b*.

In FIG. 10, the protrusion 20 comprises a central tooth 21*a* and two outer teeth 21*b*. The coils 66*a*-66*b* are wound around a first outer tooth 21*b*, while the coils 68*a*-68*b* are wound around the central tooth 21*a*, and the coils 70*a*-70*b* are wound around a second outer tooth 21*b*. Specifically, the coils 66*a*-66*b* are concentric, the coil 66*b* being wound around the coil 66*a*. Similarly, the coils 68*a*-68*b* are concentric, the coil 68*b* being wound around the coil 68*a*; and the coils 70*a*-70*b* are concentric, the coil 70*b* being wound around the coil 70*a*. The coils 66*b* and 70*b* are not completely surrounded.

The magnetic circuit in FIG. 10 comprises no air-gap. Of course, this magnetic circuit may comprise an air-gap on the protrusion 20, as previously described for FIGS. 8B, 8C, 9B and 9C.

As before, for integration constraints, the number of teeth or coils per phase can be increased or the pattern developed on the entirety of the yoke can be modified by connecting each coil of the same phase in series or in parallel in order to reduce the thickness of the device.

The invention claimed is:

1. An electrotechnical device for an aircraft comprising:

a housing having a surface, a magnetic circuit formed by a stack of laminated sheets and composed of a yoke, the magnetic circuit being cut out of the laminated sheets in one portion, the magnetic circuit and the yoke being formed in one part, said yoke being attached on the surface of said housing by a thermal interface, said yoke having a surface, and at least one low-frequency coil component, said coil component being attached to at least one portion of the surface of said yoke by attachment means.

2. The electrotechnical device of claim 1, wherein the thermal interface is a thermal paste, and wherein the yoke is glued to the surface of the housing.

3. The electrotechnical device of claim 1, wherein the thermal interface comprises a phase change material.

4. The electrotechnical device according to claim 1, wherein the surface of the housing and/or the surface of the yoke is flat.

5. The electrotechnical device according claim 1, wherein the surface of the housing and/or the surface of the yoke is concave or convex.

6. The electrotechnical device according to claim 1, further comprising a plurality of low-frequency coil components, said coil components being aligned on at least one portion of the surface of the yoke so as to form a line of coil components, and wherein each end of the line of coil components is attached to the surface of the yoke by the attachment means.

7. The electrotechnical device according to claim 1, further comprising a plurality of low-frequency coil components, wherein each coil component is attached to at least one portion of the surface of the yoke by the attachment means, the attachment means being arranged between each coil component.

8. The electrotechnical device according to claim 1, wherein the or each coil component is insulated from the yoke and its magnetic circuit by an electrically insulating material.

9. The electrotechnical device according to claim 1, wherein the housing and/or the yoke is equipped with cooling means.

10. An aircraft comprising at least one electrotechnical device according to claim 1.

11. An electrotechnical device for an aircraft comprising:

a housing having a surface, a magnetic circuit formed by a stack of laminated sheets and composed of a yoke, the magnetic circuit being cut out of the laminated sheets in one portion, said yoke having a surface and being attached on the surface of said housing by a thermal interface, said thermal interface being positioned between the yoke and the surface of said housing and being configured to perform a thermal exchange between said yoke and said housing, at least one low-frequency coil component, said coil component being attached to at least one portion of the surface of said yoke by attachment means.

* * * * *